United States Patent [19]

Okada et al.

[11] Patent Number: 5,451,848
[45] Date of Patent: Sep. 19, 1995

[54] MOTOR DRIVE CIRCUIT

[75] Inventors: Makoto Okada; Hitoshi Iwata; Katsuya Kogiso, all of Aichi, Japan

[73] Assignee: Kabushiki Kaisha Tokai-Rika-Denki-Seisakusho, Aichi, Japan

[21] Appl. No.: 117,947

[22] Filed: Sep. 8, 1993

[30] Foreign Application Priority Data

Sep. 8, 1992 [JP] Japan .................. 4-062960 U

[51] Int. Cl.$^6$ ................................ H02P 7/00
[52] U.S. Cl. ............................ 318/280; 318/254; 318/439
[58] Field of Search ............ 318/280, 293, 254, 138, 318/439

[56] References Cited

U.S. PATENT DOCUMENTS

| | | | |
|---|---|---|---|
| 4,438,378 | 3/1984 | Tanaka | 318/280 |
| 4,476,416 | 10/1984 | Licata et al. | 318/293 |
| 4,649,326 | 3/1987 | Mansman et al. | 318/293 |
| 5,210,475 | 5/1993 | Juzswik et al. | 318/293 |
| 5,287,046 | 2/1994 | Carpenter et al. | 318/293 |

*Primary Examiner*—William M. Shoop, Jr.
*Assistant Examiner*—Karen Masih
*Attorney, Agent, or Firm*—Fisher & Associates

[57] ABSTRACT

A motor drive circuit in which a first bipolar transistor is disposed between a ground terminal and one terminal of a motor, and a second bipolar transistor is disposed between the ground terminal and another terminal of the motor. Each of the transistors has a reverse breakdown voltage between an emitter and a collector which is greater than a voltage of a power source and has a reverse-direction $h_{fe}$ which is greater than or equal to a predetermined value. A resistor and a capacitor are disposed in parallel between respective bases of the first and second bipolar transistors and a ground terminal. Potential drawbacks can be prevented even when voltage of reverse polarity is supplied.

7 Claims, 8 Drawing Sheets

FIG. 8
PRIOR ART

MOTOR DRIVE CIRCUIT

BACKGROUND OF THE INVENTION

1. Field of the Invention

The present invention relates to a circuit for driving a motor.

2. Description of the Related Art

Figure 8:
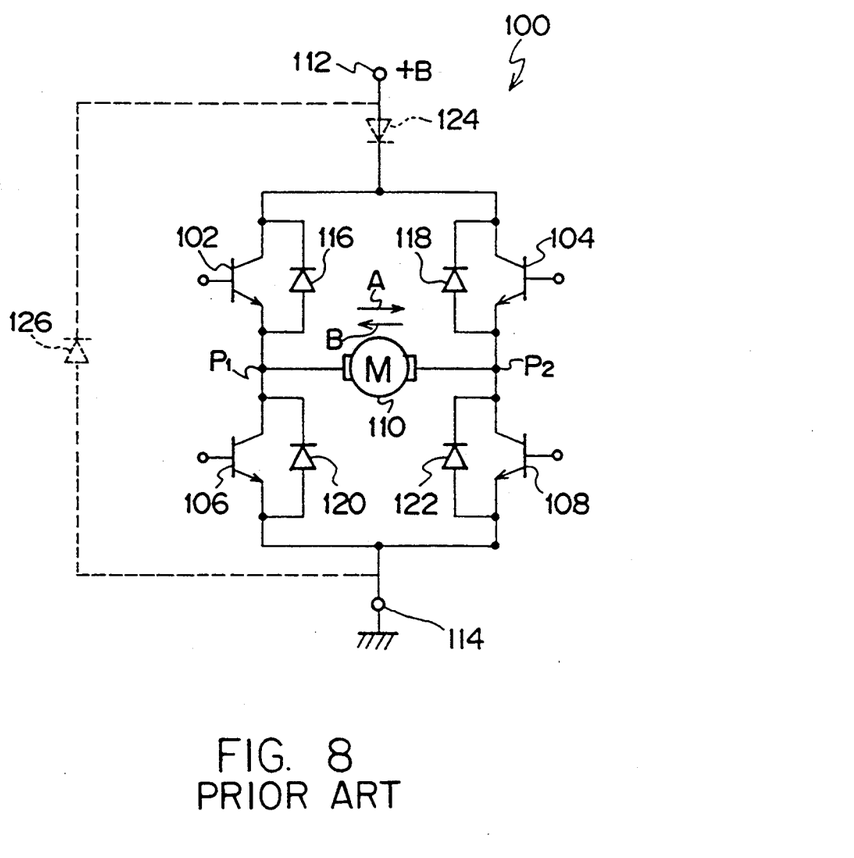
FIG. 8 is a circuit diagram showing a conventional motor drive circuit.

A drive shaft of a motor which is used, for example, for raising and lowering a window of a vehicle must rotate in both forward and reverse directions. Conventionally, such a motor is therefore driven, for example, by a drive circuit 100 as shown in FIG. 8, in which four NPN transistors 102, 104, 106 and 108 are connected to a motor 110 so that an H-shaped bridge circuit is formed. The collectors of the transistors 102 and 104 are connected to a power supply terminal 112 while the emitters of the transistors 106 and 108 are connected to a ground terminal 114. Each of the transistors is brought into an ON state by a base current supplied by an unillustrated control circuit. The power supply terminal 112 is connected to the positive terminal of a battery (not shown) while the ground terminal 114 is connected to the negative terminal of the battery.

When the drive shaft of the motor 110 is rotated in a predetermined direction, each of the transistors 102 and 108 of the drive circuit 100 is brought into an ON state. Accordingly, current flows through the motor 110 in a direction indicated by arrow A, via a power supply line and the transistor 102, so that the motor 110 is driven. When the drive shaft of the motor 110 is rotated in the direction opposite to the predetermined direction, each of the transistors 104 and 106 of the drive circuit 100 is brought into an ON state. Accordingly, current flows through the motor 110 in a direction indicated by arrow B, via the power supply line and the transistor 104, so that the motor 110 is driven.

When the ignition switch of a vehicle is turned off, an induced voltage is generated in a coil of an alternator, whereby a reverse voltage of $-80$ to $-100$ V (hereinafter referred to as "negative surge" is applied to the drive circuit 100 for an extremely short period of time (for example, a few milliseconds). Accordingly, there is the possibility that transistors of the drive circuit 100 will be damaged by the negative surge. In order to prevent the high voltage from being applied to the transistors even when the negative surge is produced and in order to protect the transistors, diodes 116, 118, 120 and 122 are connected between the emitters and collectors of the transistors 102, 104, 106 and 108, respectively.

Further, in a case in which the rotation of the drive shaft of the motor 110 is hindered under the condition that the motor 110 is being driven by maintaining the ON state of the transistors 102 and 108, and the transistor 102 is subsequently turned off, an induced voltage is generated in the coil of the motor 110. The electric potential at a point $P_1$ shown in FIG. 8 becomes negative (hereinafter referred to as "counterelectromotive voltage"). The ON state of the transistor 108 is therefore maintained even after the transistor 102 has been turned off so as to make the current circulate via the diode 120, point $P_1$ motor 110 and transistor 108, thereby absorbing the counterelectromotive voltage.

Moreover, in the case where the rotation of the drive shaft of the motor 110 is hindered under the condition that the motor 110 is being driven by maintaining the ON state of the transistors 102 and 108, and the transistor 108 is subsequently turned off, an induced voltage is generated in the coil of the motor 110, whereby the electric potential at a point $P_2$ shown in FIG. 8 becomes higher than the voltage of the power source (counterelectromotive voltage). The ON state of the transistor 102 is therefore maintained even after the transistor 108 has been turned off so as to make current circulate via the diode 118, transistor 102, point $P_1$, motor 110 and point $P_2$, thereby absorbing the counterelectromotive voltage. The locking of the motor occurs, for example, when the movement of a power window glass which is driven by the motor 110 is obstructed by snow.

Moreover, in a case in which the transistor 102 is turned off when the motor 110 is being driven and the transistors 102 and 108 are on, the rotation of the drive shaft of the motor 110 continues due to inertia, whereby the motor 110 generates electrical energy. Due to the generation of the electrical energy, voltage is produced at the point $P_1$ shown in FIG. 8 (hereinafter referred to as "brake voltage"), so that the rotation of the drive shaft of the motor 110 is not stopped immediately. Therefore, the transistor 106 is turned on at the same time as the transistors 102 and 108 are turned off, so as to make current circulate via the diode 122, point $P_2$, motor 110 and transistor 106, thereby absorbing the brake voltage. Accordingly, the drive shaft is braked and the rotation is instantaneously stopped.

When electrical wires are connected to the positive and negative terminals of a battery of a vehicle, the electrical wires may be mistakenly connected to the wrong terminals, and the polarity of the voltage applied between the power supply terminal 112 and the ground terminal 114 of the drive circuit 100 is reversed. In such a case, heavy-current flows from the ground terminal 114 to the power supply terminal 112 via the diodes 120 and 116 and the diodes 122 and 118, because the forward direction of the diodes 116, 118, 120 and 122 coincides with the polarity of the applied voltage. This causes a drawback in that an unillustrated fuse for protecting the drive circuit 110 is blown.

To prevent the occurrence of the above-mentioned drawback, there has been proposed an approach in which a diode 124 is connected between the power supply terminal 112 and the collectors of the transistors 102 and 104, as indicated by the broken line in FIG. 8, so that the forward direction of the diode 124 becomes opposite to the direction of the above-mentioned heavy-current. Although this approach makes it possible to prevent the short between the power supply terminal and the ground terminal, the power consumption of the diode 124 increases when the drive current of the motor 110 increases, which causes a drawback in that the quantity of heat generated by the diode 124 increases.

Moreover, in an attempt to obviate this problem, when a diode 126, instead of the diode 124, is connected between the power supply terminal 112 and the ground terminal 114, as indicated by the broken line in FIG. 8, so that the forward direction of the diode 126 coincides with the direction of the above-mentioned heavy-current, the diode 126 consumes no power under ordinary operating conditions and is capable of protecting the drive circuit 110, by allowing a short current to flow through the diode 126, when the electrical wires are conversely connected to the terminals of the battery. However, in such a case, a fuse for protecting the electrical wires is blown.

SUMMARY OF THE INVENTION

Accordingly, it is an object of the present invention to provide an improved circuit for driving a motor, which is capable of preventing the occurrence of drawbacks even when the polarity of the supply voltage is reversed.

Figure 1:
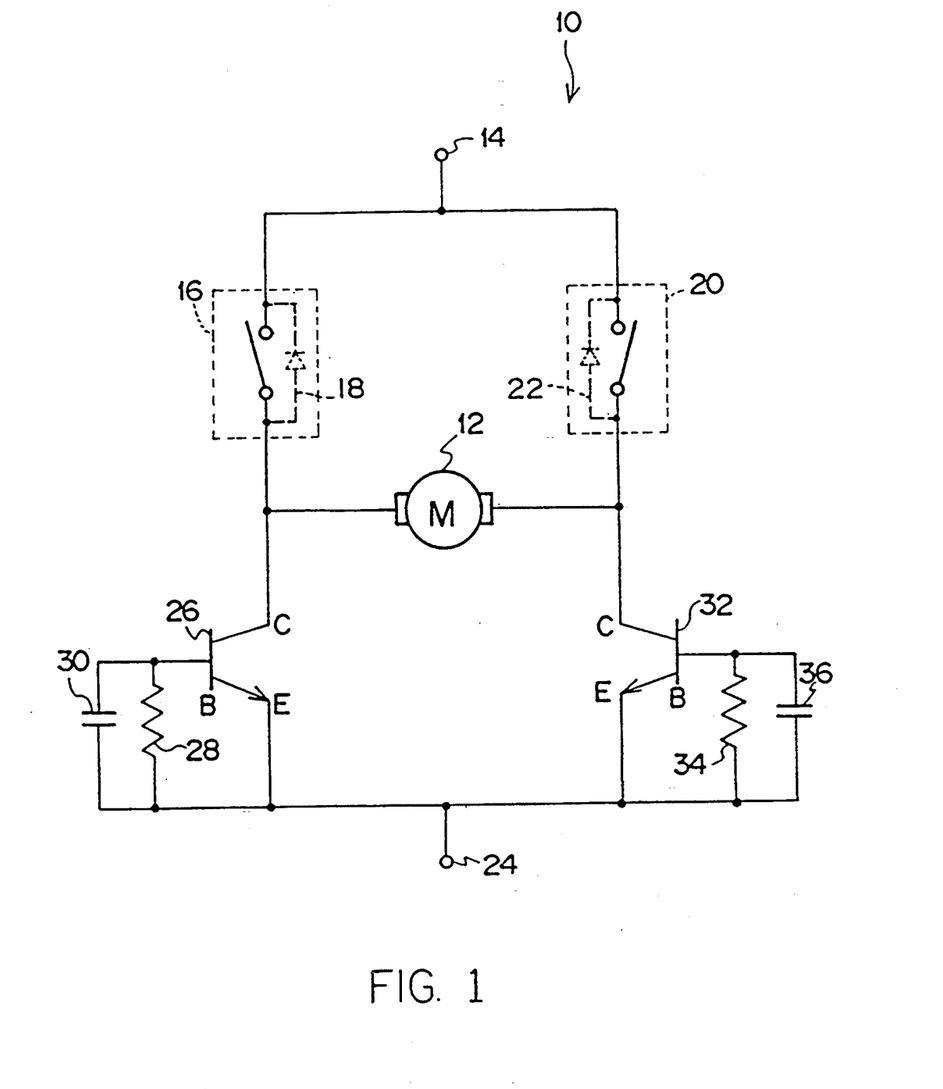
FIG. 1 is a circuit diagram showing a motor drive circuit according to the present invention.

To achieve the above-mentioned object, a motor drive circuit 10 according to the present invention includes, as shown in FIG. 1, first switching means 16 for allowing and prohibiting flow of current between a power supply terminal 14 and one terminal of a motor 12; second switching means 20 for allowing and prohibiting flow of current between the power supply terminal 14 and another terminal of the motor 12; a first bipolar transistor 26 whose collector is connected to the one terminal of the motor 12 and whose emitter is connected to a ground terminal 24, the first bipolar transistor 26 having a reverse breakdown voltage between the emitter and the collector which is greater than a voltage of a power source and having a reverse-direction $h_{fe}$ greater than or equal to a predetermined value; a first resistor 28 disposed between a base of the first bipolar transistor 26 and the ground terminal 24; a first capacitor 30 connected in parallel to the first resistor 28; a second bipolar transistor 32 whose collector is connected to the other terminal of the motor 12 and whose emitter is connected to the ground terminal 24, the second bipolar transistor 32 having a reverse breakdown voltage between the emitter and the collector which is greater than the voltage of the power source and having a reverse-direction $h_{fe}$ which is greater than or equal to a predetermined value; a second resistor 34 disposed between a base of the second bipolar transistor 32 and the ground terminal 24; and a second capacitor 36 connected in parallel to the second resistor 34.

When the first switching means 16 and the second switching means 20 are constituted, for example, by switching elements such as transistors, as will be explained in an embodiment, it is preferable that diodes 18 and 22 are connected in parallel to the switching means 16 and 20 so that the forward direction of the diodes 18 and 22 becomes opposite to the direction of the current.

Ordinarily, the power supply terminal 14 and the ground terminal 24 of the motor drive circuit 10 according to the present invention are connected to the positive and negative terminals of a battery, respectively, so that voltage is applied between the power supply terminal 14 and the ground terminal 24. When the drive shaft of the motor 12 is rotated in a predetermined direction, the first switching means 16 is turned on, and a predetermined current is supplied to the base of the second bipolar transistor 32 so as to turn the transistor 32 on. Accordingly, current for driving the motor flows from the power supply terminal 14 to the ground terminal 24 via the first switching means 16, the motor 12, and the collector and emitter of the transistor 32, whereby the motor 12 is driven.

Further, when the drive shaft of the motor 12 is rotated in the direction opposite to the predetermined direction, the second switching means 20 is turned on, and a predetermined current is supplied to the base of the first bipolar transistor 26 so as to turn the transistor 26 on. Accordingly, current for driving the motor flows from the power supply terminal 14 to the ground terminal 24 through the second switching means 20, the motor 12, and the collector and emitter of the transistor 26, whereby the motor 12 is driven. Various switching elements can be used as the first switching means 16 and second switching means 20. Examples of switching elements include a PNP-type bipolar transistor, an NPN-type bipolar transistor, a MOSFET and the like.

When the polarity of the supply voltage is reversed by mistake, for example, the power supply terminal 14 is connected the negative terminal of the battery while the ground terminal 24 is connected to the positive terminal of the battery, the emitters and collectors of the first and second bipolar transistors 26 and 32 are supplied with voltage of polarity opposite to the ordinary polarity. Since each of the transistors has a reverse breakdown voltage between the emitter and the collector which is greater than the voltage of the power source, each of the transistors acts as a resistor having an extremely high electrical resistance. Therefore, a fuse (not shown) for protecting the motor drive circuit 10 or the like is not blown. Further, the consumption of electrical energy and the generation of heat, which would otherwise occur with a diode (diode 124 shown in FIG. 8) in a conventional circuit, do not occur. Therefore, the motor drive circuit can solve the drawbacks of the conventional art.

When the direction of the applied voltage is reversed, currents flow from the ground terminal 24 to the collectors of the transistors via the first and second resistors 28 and 34 and the bases of the respective transistors. Since the magnitudes of these currents can be made extremely small by using resistors such as the resistors 28 and 34 having high electrical resistances, the current flowing from the emitter to collector of the transistor 26 and the current flowing from the emitter to collector of the transistor 32 can be made extremely small. The transistors 26 and 32 are thereby prevented from being electrically damaged.

Figure 2A:
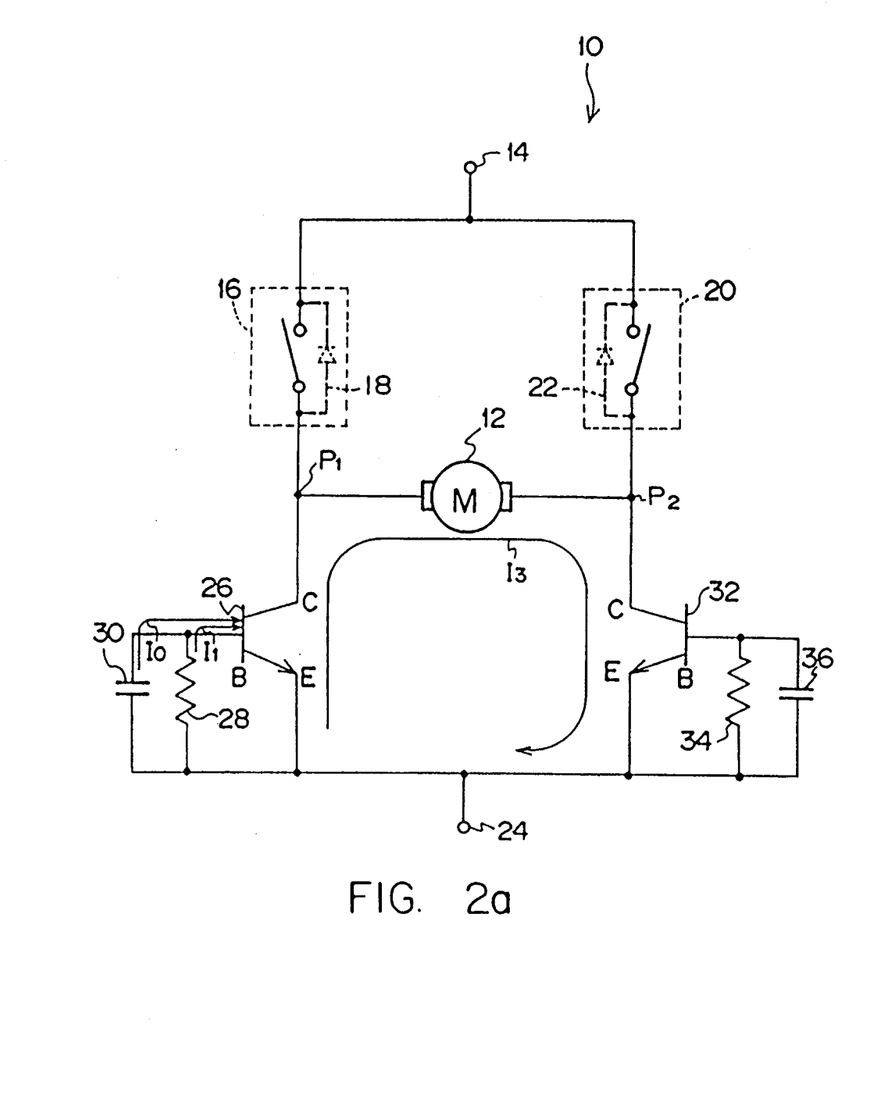
FIG. 2a is a circuit diagram for explaining the operation of the motor drive circuit of FIG. 1; circuit diagram for explaining operation of the motor drive circuit when a counterelectromotive voltage is generated therein.
Figure 2B:
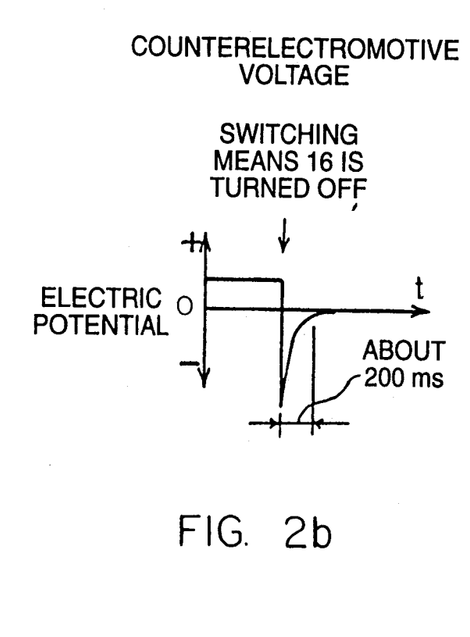

Further, in the motor drive circuit 10, counterelectromotive voltage and brake voltage can be absorbed in the following manner. For example, in a case in which the rotation of the drive shaft of the motor 12 is locked while the motor 12 is being driven and the first switching means 16 and the second bipolar transistor 32 are on, and the first switching means 16 is subsequently turned off, an induced voltage is generated in the coil of the motor 12, whereby a counterelectromotive voltage is produced so that the electric potential at a point $P_1$ becomes very negative, as shown in FIG. 2. Due to the counterelectromotive voltage, voltage is applied between the both terminals of the resistor 28 and the capacitor 30 and between the emitter and collector of the transistor 26. Since the capacitor 26 is in a shorted condition when no charges are stored therein, a large current $I_0$ flows through the capacitor 26 instantaneously. The current $I_0$ flows into the base of the transistor 26 together with current $I_1$ flowing through the resistor 28.

Since the transistor 26 is a bipolar transistor, it operates in the reverse direction in accordance with the base current. Accordingly, if the transistor 32 is left on at this time, current $I_3$ circulates from the ground terminal 24 to the motor 12 via the emitter and collector of the transistor 26 and the point $P_1$, and then to the ground terminal 24 via the collector and emitter of the transistor 32, whereby the counterelectromotive voltage is instantaneously absorbed, as shown in FIG. 2. When the counterelectromotive voltage has been absorbed, the current $I_0$ becomes zero.

Further, in a case in which the rotation of the drive shaft of the motor 12 is locked when the motor 12 is being driven and the first switching means 16 and the second bipolar transistor 32 are on, and the transistor 32 is subsequently turned off, an induced voltage is generated in the coil of the motor 12, whereby the electric potential at a point P2 becomes higher than the voltage of the power source (counterelectromotive voltage). In a case in which a diode 22 is connected in parallel to the second switching means 20, the first switching means 16 remains on even after the transistor 32 has been turned off so as to make current circulate through the diode 22, the first switching means 16, the point P1, the motor 12 and the point P2, whereby the counterelectromotive voltage is absorbed.

When the second switching means 20 is comprised of a relay or a similar element which allows the flow of the current from the point P2 to the first switching means 16 while the switching means 20 is on, the diode 22 can be omitted. In such a case, the second switching means 20 may be turned on instead in order to absorb the counterelectromotive voltage.

Figures 3A, 3B, 3C:
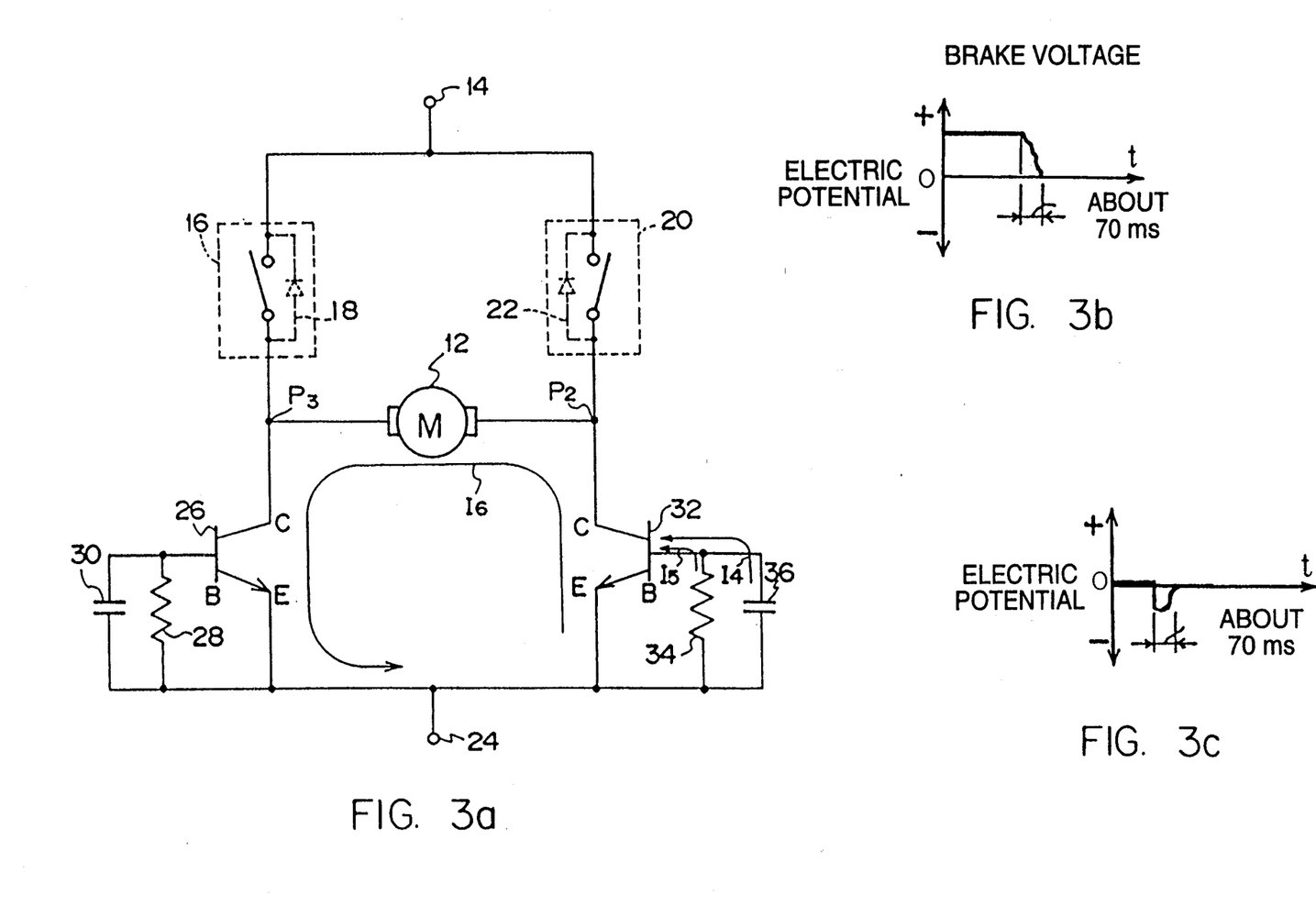

Further, in a case in which the first switching means 16 is turned off while the motor 12 is being driven and the first switching means 16 and the second bipolar transistor 32 are on, the rotation of the drive shaft of the motor 12 continues due to inertia, whereby the motor 12 generates electrical energy. Due to the generation of the electrical energy, a brake voltage is produced at point P3, as shown in FIG. 3. Therefore, if the transistor 32 is turned off at the same time the transistor 26 is turned on, currents I4 and I5 flow, as shown in FIG. 3, due to the decrease of the electric potential at point P2.

Accordingly, the bipolar transistor 32 operates in the reverse direction. Accordingly, if the transistor is held on at this time, current I6 circulates from the ground terminal 24 to motor 12 via the emitter and collector of the transistor 32 and the point P2, and then to the ground terminal 24 via the collector and emitter of the transistor 26, whereby the brake voltage is instantaneously absorbed, as shown in FIG. 3. Since the bipolar transistor 32 operates in the reverse direction, the transistor must have a reverse-direction $h_{fe}$ larger than a predetermined value which is sufficient to absorb the brake voltage.

In the present invention, as described above, first and second bipolar transistors, which each have a reverse breakdown voltage between the emitter and the collector and which each has a reverse-direction $h_{fe}$ higher than a predetermined value, are disposed between a terminal of a motor and a ground terminal, respectively. Further, a resistor and a capacitor are disposed in parallel between the respective bases of the first and second bipolar transistors and the ground terminal. Therefore, the present invention has an excellent effect of preventing the occurrence of drawbacks even when the polarity of the applied voltage is reversed. The value of the reverse-dimention $h_{fe}$ is generally higher than 100.

BRIEF DESCRIPTION OF THE DRAWINGS

FIG. 2b is a graph of counterelectromotive voltage which is generated in the circuit of FIG. 2a;

FIG. 3a is a circuit diagram for explaining operation of the motor drive circuit when a brake voltage is generated therein;

FIG. 3b is a graph of break voltage which is generated in the circuit of FIG. 3a;

FIG. 3c is a graph of electric potential which is generated in the circuit of FIG. 3a;

FIG. 5b is a graph of break voltage which is generated in the circuit of FIG. 5a;

FIG. 6b is a graph of counterelectromotive voltage which is generated in the circuit of FIG. 6a;

FIG. 7b is a graph of negative surge which is generated in the circuit of FIG. 7a;

DETAILED DESCRIPTION OF THE PREFERRED EMBODIMENT

Figure 4:
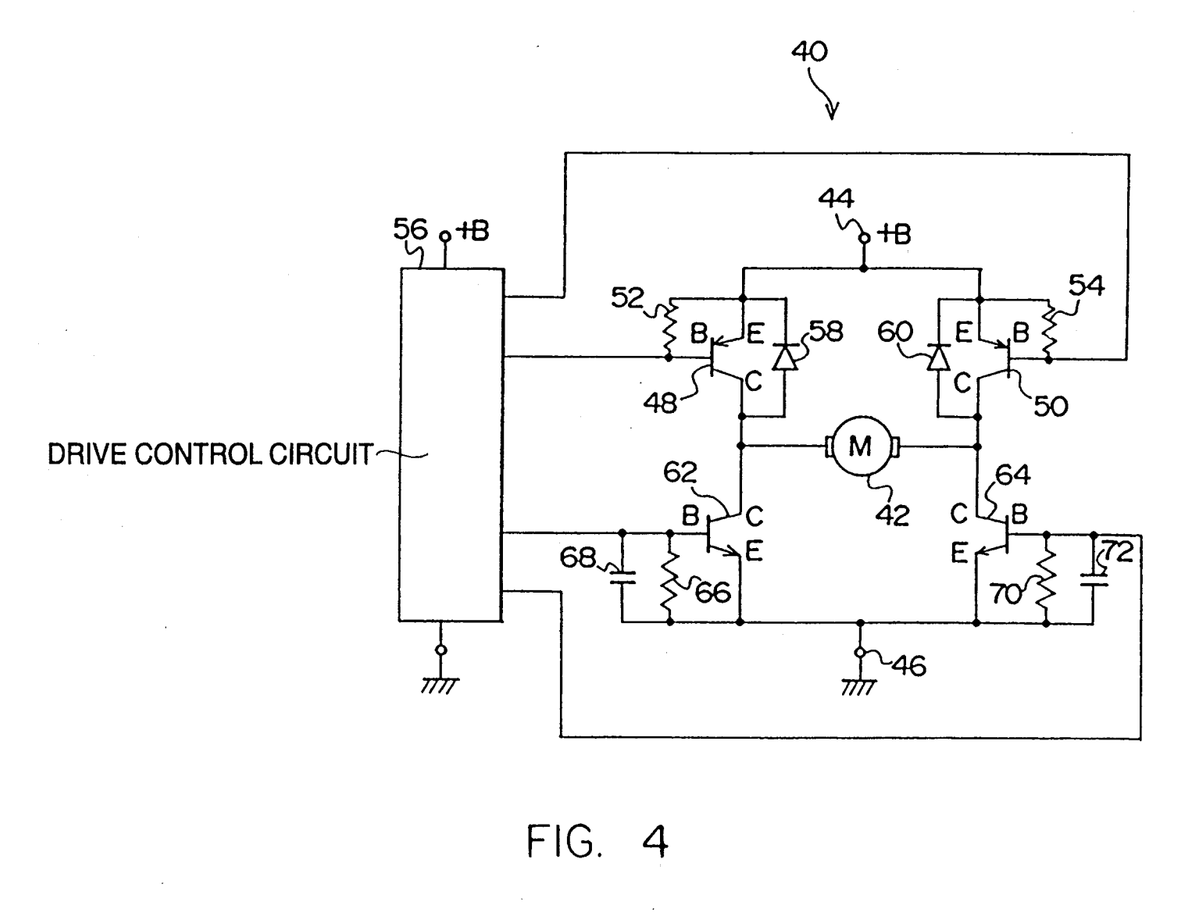
FIG. 4 is a circuit diagram showing a motor drive circuit according to an embodiment of the present invention.

The present invention will now be explained in detail with reference to the drawings. FIG. 4 shows a motor drive circuit 40 according to the present embodiment. The drive shaft of a motor 42 driven by the motor drive circuit 40 is connected to an unillustrated raising and lowering mechanism for raising and lowering a side window of a vehicle. The side window is raised and lowered by the rotation of the drive shaft of the motor 42 in the forward and reverse directions. The motor drive circuit 40 is provided with a power supply terminal 44 and a ground terminal 46. The power supply terminal 44 is connected to the positive terminal of a battery (not shown) of the vehicle, while the ground terminal 46 is connected to the negative terminal of the battery through the body of the vehicle. Accordingly, voltage of the battery of the vehicle (about 12 volts) is applied between the power supply terminal 44 and the ground terminal 46.

Connected to the power supply terminal 44 are the emitter of a PNP-type transistor 48 and the emitter of a PNP-type transistor 50. Resistors 52 and 54 are connected between the bases and emitters of the transistors 48 and 50, respectively. The bases of the transistors 48 and 50 are connected to a drive control circuit 56. An unillustrated switch for a power window system is connected to the drive control circuit 56. The drive control circuit 56 initiates and terminates the flows of currents from the emitters to bases of the transistors 48 and 50 in accordance with operation of the switch. Currents thereby flow from the emitters to collectors of the transistors 48 and 50.

The collector of the transistor 48 is connected to one terminal of the motor 42 while the collector of the transistor 50 is connected to the other terminal of the motor 42. Connected to the emitter of the transistor 48 is the cathode of a diode 58. The anode of the diode 58 is connected to the collector of the transistor 48. Similarly, the cathode of a diode 60 is connected to the emitter of the transistor 50, while the anode of the diode 60 is connected to the collector of the transistor 50.

Further, the collector of an NPN-type bipolar transistor 62 is connected to one terminal of the motor 42, and the collector of an NPN-type bipolar transistor 64 is connected to the other terminal of the motor 42. Each of the transistors 62 and 64 has a reverse-direction breakdown voltage which is sufficiently larger than the voltage applied between the power supply terminal 44 and the ground terminal 46 (e.g., the reverse-direction breakdown voltage is about 20 volts). Reverse-direction breakdown voltage refers to breakdown voltage at a time when voltage is applied between the emitter and collector of a transistor such that the electric potential at the emitter becomes positive and the electric potential at the collector becomes negative, while the base thereof is in an open state (i.e., breakdown voltage when the polarity of the voltage is opposite that of a so-called $V_{CEO}$). The bases of the transistors 62 and 64 are also connected to a drive control circuit 56. The drive control circuit 56 initiates and terminates the flows of currents from the emitters to bases of the transistors 62 and 64 in accordance with operation of the switch. Currents thereby flow from the collectors to emitters of the transistors 62 and 64. The emitters of the transistors 62 and 64 are respectively connected to the ground terminal 46.

Moreover, a resistor 66 and a capacitor 68 are connected between the base and the emitter of the transistor 62 (i.e., between the base and the ground terminal 46). A resistor 70 and a capacitor 72 are connected between the base and the emitter of the transistor 64. As an example, each of the resistors 66 and 70 has an electrical resistance of about 1KΩ while each of the capacitors 68 and 72 has a capacitance of about 220 μF.

Operation of the present embodiment will now be explained. When the switch for the power window system is operated to output a designation for moving the side window in a predetermined direction (for example, upward direction), the drive control circuit 56 responds to the designation and turns the transistors 48 and 64 on. Current thereby flows from the power supply terminal 44 to the ground terminal 46 via the transistor 48, the motor 42 and the transistor 64 so that the motor 42 is driven to move the side window in the predetermined direction. When a designation for stopping the movement is input, the drive control circuit 56 turns the transistors 48 and 64 off state, and turns the transistor 62 on. The transistor 62 is turned off after a predetermined period of time has elapsed.

Figure 5A:
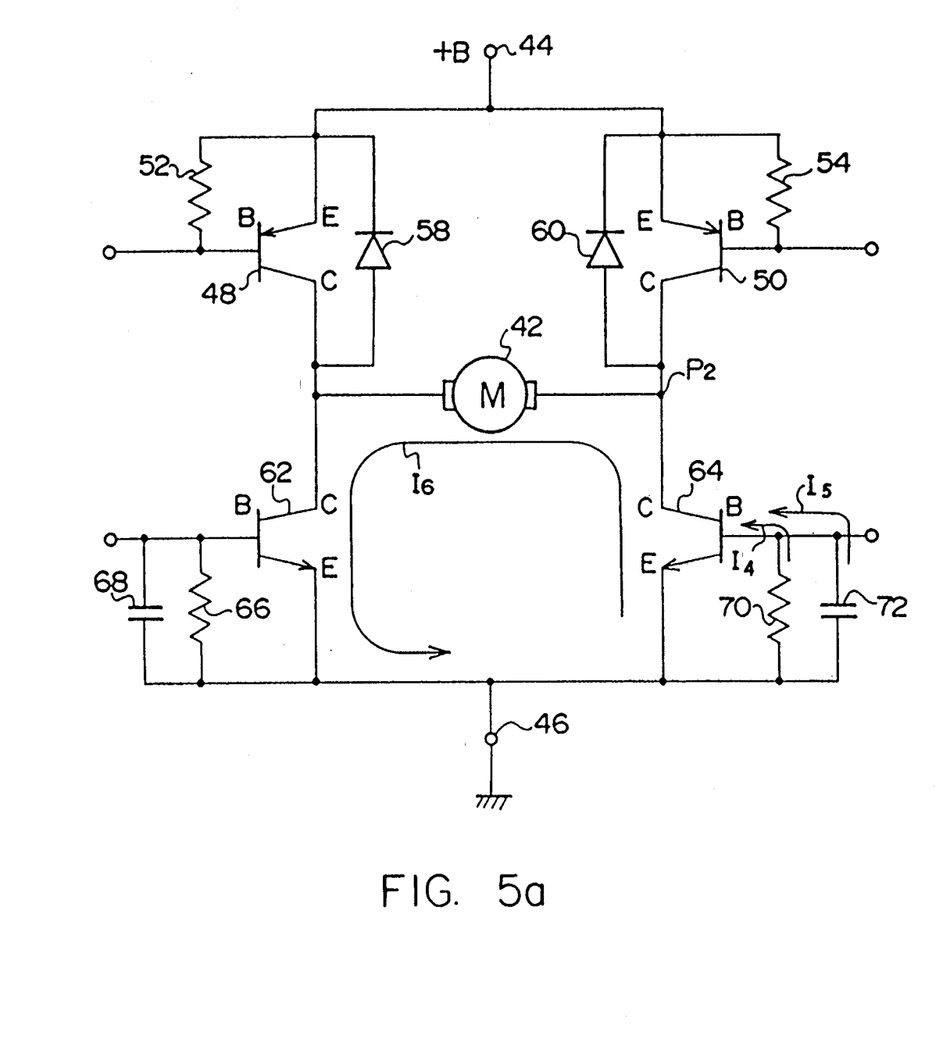
FIG. 5a is a circuit diagram for explaining operation of the motor drive circuit, as an effect of the embodiment, when a brake voltage is generated therein.
Figure 5B:
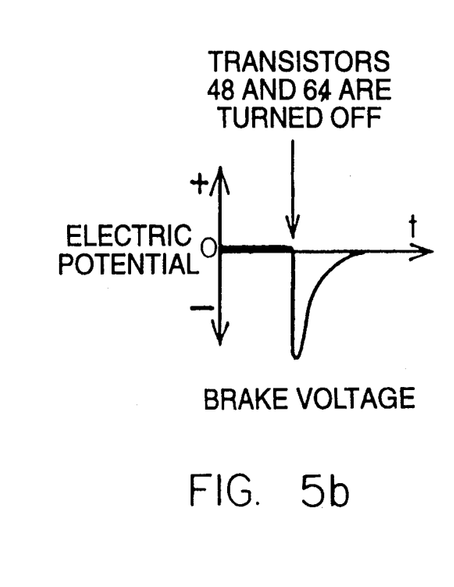

Operation at this time will be explained in further detail. When the transistors 48 and 64 are turned off and the transistor 62 is turned on while the motor 42 is being driven, the rotation of the drive shaft of the motor 42 continues due to inertia. The motor 42 acts as a generator for producing a brake voltage so that the electric potential at the point P₂ shown in FIG. 5 becomes negative. Due to the brake voltage, a large current I₅ flows through the capacitor 72, as shown in FIG. 5, and then flows into the base of the transistor 64 together with the current 14 flowing through the resistor 70.

As a result, the transistor 64 operates in a reverse direction. Since the transistor 62 is in the ON state, current I₆ circulates from the ground terminal 46 to the motor 42 via the transistor 64 and the point P₂, and then to the ground terminal 46 via the transistor 62, whereby the brake voltage is instantaneously absorbed. The current 16 is calculated by the formula $(I_4+I_5) \times h_{fe}$, wherein $h_{fe}$ is the common emitter reverse small-signal current gain of the transistor 64. Due to the absorption of the brake voltage, the rotation of the drive shaft of the motor 42 stops. After a predetermined period of time which is sufficient to absorb the brake voltage has elapsed, the transistor 62 is turned off and returns to its ordinary condition.

When the switch is operated to output a designation for moving the side window in the direction opposite to the predetermined direction (for example, downward direction), the drive control circuit 56 responds to the designation and turns the transistors 50 and 62 on. When a designation for stopping the movement is then input, the drive control circuit 56 turns the transistors 50 and 62 off, and turns the transistor 64 on. The transistor 64 is turned off after a predetermined period of time has elapsed. Accordingly, a brake voltage is absorbed in a manner similar to that described above, whereby the rotation of the drive shaft of the motor 42 immediately stops.

On the other hand, when it is judged that the rotation of the drive shaft of the motor 42 is locked due to, for example, the arrival of the side window at its uppermost position or lowermost position, while the motor 42 is being driven and the transistors 48 and 64 are on, the drive control circuit 56 first turns the transistor 48 off, and then turns the transistor 64 off after a predetermined period of time has elapsed. The locked condition of the motor 42 can be detected by judging whether the current flowing through the coil of the motor 42 exceeds a predetermined value. The condition can also be ascertained by mechanically detecting the movement of the window.

Figure 6A:
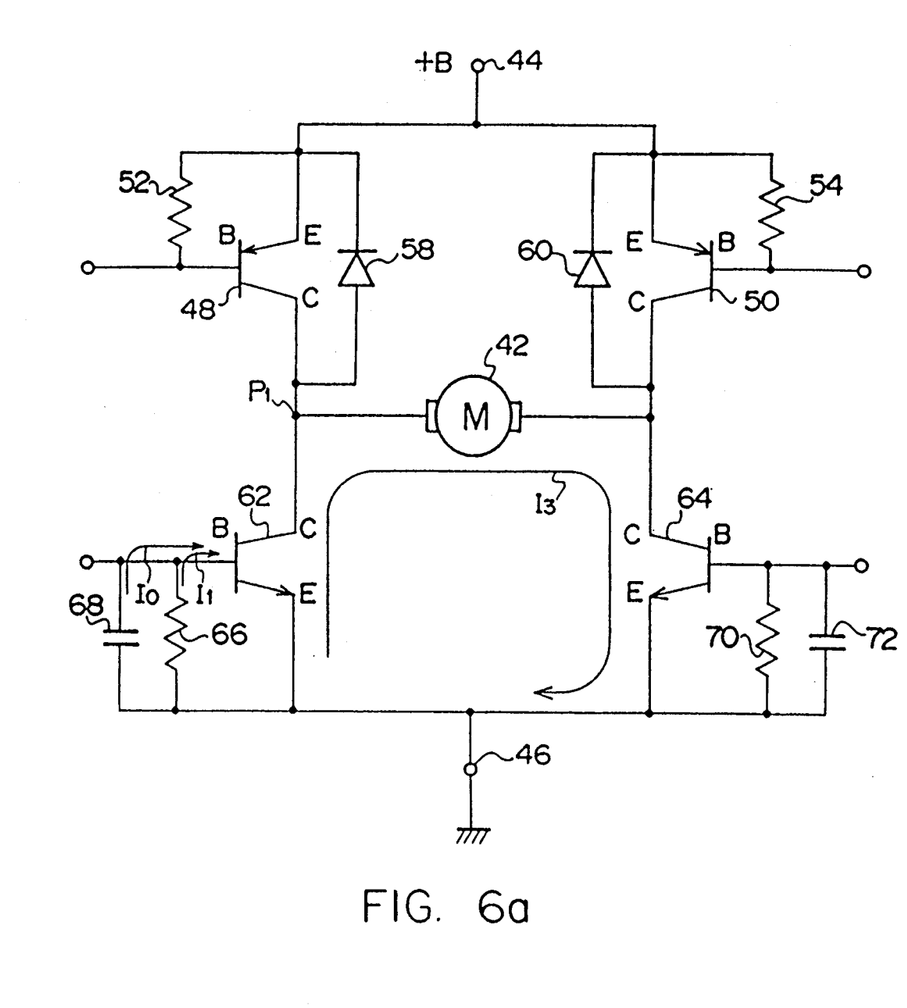
FIG. 6a is a circuit diagram for explaining operation of the motor drive circuit, as an effect of the embodiment, when a counterelectromotive voltage is generated therein.
Figure 6B:
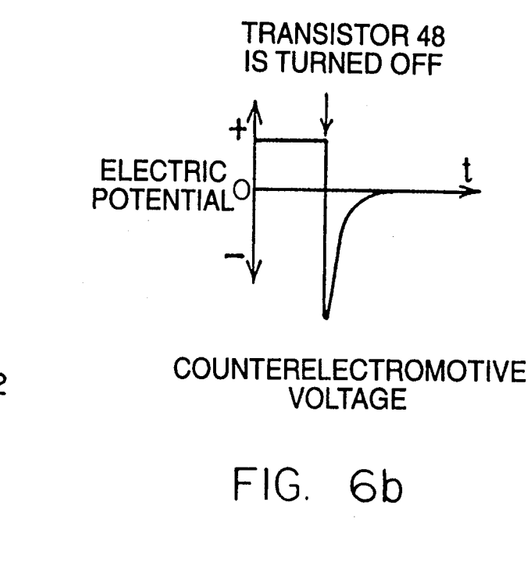

Operation at this time will be explained in further detail. When the supply of the drive current to the motor 42 is stopped in a state in which the rotation of the drive shaft of the motor 42 is locked, an induced voltage is generated in the coil of the motor 42. A counterelectromotive voltage is produced so that the electric potential at point P₁ shown in FIG. 6 becomes very negative. Due to the counterelectromotive voltage, a huge current I₀ flows through the capacitor 68 instantaneously. The current I₀ flows into the base of the transistor 62 together with current I₁ flowing through the resistor 66. As a result, the transistor 62 operates in a reverse direction. Since the ON state of the transistor 64 maintained, current I₃ circulates from the ground terminal 46 to the motor 42 via the transistor 62 and the point P₁, and then to the ground terminal 46 via the transistor 64, whereby the counterelectromotive voltage is instantaneously absorbed. The current I₃ is calculated by the formula $(I_0 + I_1) \times h_{fe}$. After a predetermined period of time which is sufficient to absorb the counterelectromotive voltage has elapsed, the transistor 64 is turned off and returns to its ordinary condition.

When it is judged that the rotation of the drive shaft of the motor 42 is locked while the motor 42 is being driven and the transistors 50 and 62 are on, the drive control circuit 56 turns transistor 50 off, and then turns the transistor 62 off after a predetermined period of time has elapsed. Accordingly, a counterelectromotive voltage is absorbed in a manner similar to that described above.

Figure 7A:
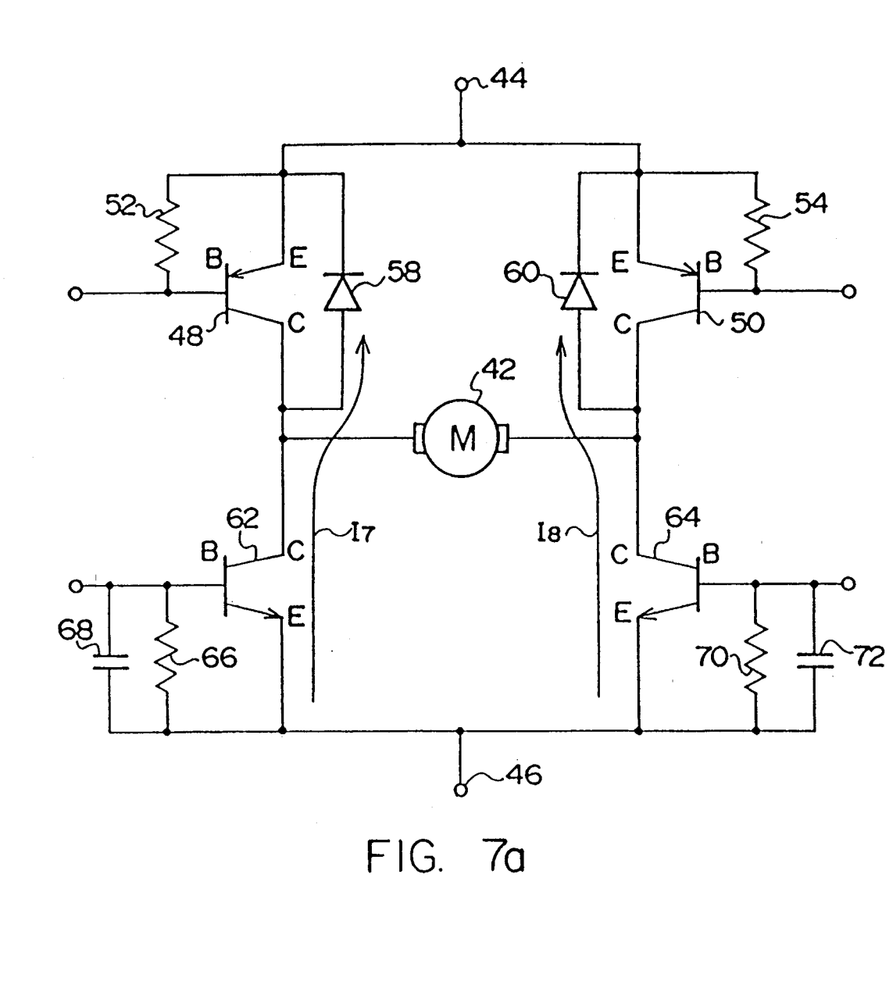
FIG. 7a is a circuit diagram for explaining operation of the motor drive circuit, as an effect of the embodiment, when a negative surge is generated therein.
Figure 7B:
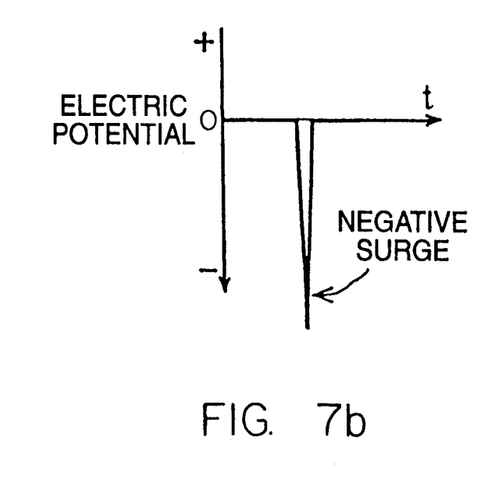

Further, when the ignition switch of the vehicle is turned off, a negative surge is generated, as mentioned above, so that voltage of a polarity of which is opposite to ordinary polarity is applied between the power supply terminal 44 and the ground terminal 46 over an extremely short period of time. In this case, large currents flow through the capacitors 68 and 72 instantaneously, whereby the transistors 62 and 64 instantaneously operate in the reverse direction. As a result, as shown in FIG. 7, current $I_7$ flows from the ground terminal 46 to the power supply terminal 44 via the transistor 62 and the diode 58, while current $I_8$ flows from the ground terminal 46 to the power supply terminal 44 via the transistor 64 and the diode 60. Accordingly, the voltage of reverse polarity applied between the collectors and emitters of the transistors 62 and 64 can be reduced to less than or equal to 20 volts, which prevents the occurrence of drawbacks, such as the breakage of the transistors 48, 50, 62 and 64 due to a negative surge. Since the negative surge occurs over an extremely short period of time, the fuse of the vehicle is not blown.

If an operator errs and reversely connects the electrical wires to the positive and negative terminals of the battery, the power supply terminal 44 is connected to the negative terminal of the battery while the ground terminal 46 is connected to the positive terminal of the battery, whereby the polarity of the voltage applied to the circuit is reversed. Therefore, the emitters and collectors of the transistors 62 and 64 are supplied with voltages of reverse polarity. Since the breakdown voltage between the emitter and collector of each of the transistors 62 and 64 is greater than the voltage applied to the power supply terminal 44 and the ground terminal 64, as mentioned above, each of the transistors 62 and 64 acts as a resistor having an extremely high electrical resistance. Therefore, potential drawbacks such as blowing of the fuse of the vehicle can be prevented from occurring.

When the direction of the voltage applied between the power supply terminal 44 and the ground terminal 46 is reversed, current flows from the bases of the transistors 62, 64 to the collectors via the resistors 66 and 70. Since this current is extremely small due to the high electrical resistance of the resistors 66 and 70, the current flowing from the collectors of the transistors 62 and 64 to the power supply terminal 44 is also extremely small. At the instance that current due to the reverse connection is applied to the capacitors 68 and 72, a large current flows, and the transistors 62 and 64 are instantaneously operated in the reverse direction. However, since the magnitude of the current sharply decreases as electrical charges accumulate in the capacitors 62 and 64 and the operations of the transistors 62 and 64 stop accordingly, potential drawbacks, such as the blowing of the fuse of the vehicle can be prevented from occurring.

In the present embodiment, the PNP type transistors 48 and 50 are used as a switching means. In the present invention, however, other types of switching elements such as an NPN-type transistor, FET, MOSFET, thyristor, GTO and the like can be used, as well as a relay or the like.

Although an explanation has been given with reference to the embodiment in which a motor of a power window system of a vehicle is driven by the motor drive circuit according to the present invention, the circuit according to the present invention is not limited to the same and can be applied to other drive circuits in which the drive shaft of a motor is required to be rotated in forward and reverse directions. Further, the present invention can be applied to various technical fields other than the field of automobiles. When applied to other technical fields, there may be cases where no inductive load (for example, alternators in vehicles) is connected between the positive and negative terminals of the power source. In such a case, the diodes 58 and 60 mentioned in the above-mentioned embodiment can be omitted, because it is not necessary to take negative surge into account.

What is claimed is:

1. A motor drive circuit comprising:

first switching means for allowing and prohibiting flow of current between a power supply terminal and a first terminal of a motor;

second switching means for allowing and prohibiting flow of current between said power supply terminal and a second terminal of said motor;

a first bipolar transistor whose collector is directly connected to one of said terminals of said motor and whose emitter is connected to a ground terminal, said first bipolar transistor having a reverse breakdown voltage between said emitter and said collector which is greater than a voltage of a power source and having a reverse-direction $h_{fe}$ which is greater or equal to a predetermined value, said first transistor, having said reverse breakdown voltage and said reverse-direction $h_{fe2}$ for providing for absorption of counter-electromotive voltage and negative surges;

a first resistor disposed between a base of said first bipolar transistor and said ground terminal;

a first capacitor connected in parallel to said first resistor;

a second bipolar transistor whose collector is directly connected to the other of said terminals of said motor and whose emitter is connected to said ground terminal, said second bipolar transistor having a reverse breakdown voltage between said emitter and said collector which is greater than said voltage of said power source and having a reverse-direction $h_{fe}$ which is greater than or equal to a predetermined value, said second transistor, having said reverse breakdown voltage and said reverse-direction $h_{fe2}$ for providing for absorption of counter-electromotive voltage and negative surges;

a second resistor disposed between a base of said second bipolar transistor and said ground terminal; and a second capacitor connected in parallel to said second resistor.

2. A motor drive circuit according to claim 1, wherein each of said first switching means and said second switching means is comprised of a bipolar transistor.

3. A motor drive circuit according to claim 1, wherein each of said first switching means and said second switching means is comprised of a MOSFET.

4. A motor drive circuit according to claim 1, wherein each of said first switching means and said second switching means is comprised of a relay.

5. A motor drive circuit according to claim 1, further comprising:

a first diode connected in parallel to said first switching means such that a power supply terminal side becomes a cathode of said first diode; and a second diode connected in parallel to said second switching means such that a power supply terminal side becomes a cathode of said second diode.

6. A motor drive circuit according to claim 1, wherein each of said first resistor and said second resistor has a resistance value of about 1 kΩ.

7. A motor drive circuit according to claim 1, wherein each of said first capacitor and said second capacitor has a capacitance of about 220 μF.

* * * * *